United States Patent [19]

Pickering, Jr. et al.

[11] Patent Number: 5,545,599
[45] Date of Patent: Aug. 13, 1996

[54] PROCESS FOR WHITENING KAOLIN

[75] Inventors: Samuel M. Pickering, Jr., Macon; J. Elmo Bloodworth, Milledgeville; Donald G. Turner, Washington, all of Ga.

[73] Assignee: U.S. Borax, Inc., Valencia, Calif.

[21] Appl. No.: 311,522

[22] Filed: Sep. 23, 1994

[51] Int. Cl.$^6$ .................................................. C04B 33/04
[52] U.S. Cl. ...................... 501/146; 501/145; 106/416; 106/486; 252/188.22
[58] Field of Search ........................... 501/146, 145; 106/416, 486; 252/188.22

[56] References Cited

U.S. PATENT DOCUMENTS

| | | | |
|---|---|---|---|
| 1,492,184 | 4/1924 | Weir et al. | |
| 1,991,819 | 2/1935 | Nutting | 252/2 |
| 1,999,773 | 4/1935 | McMichael | 252/8 |
| 2,018,987 | 10/1935 | Wirzmuller | 252/2 |
| 2,388,302 | 11/1945 | Weyl | 23/110 |
| 2,400,020 | 5/1946 | Pierce et al. | 196/52 |
| 2,477,664 | 8/1949 | Shabaker | 252/450 |
| 2,489,332 | 11/1949 | Shabaker | 252/450 |
| 2,754,273 | 7/1956 | Shabaker | 252/450 |
| 3,274,011 | 9/1966 | Duke | 106/72 |
| 3,414,422 | 12/1968 | Iannicelli et al. | 106/288 |
| 3,471,011 | 10/1969 | Iannicelli et al. | 209/214 |
| 3,627,678 | 12/1971 | Marston et al. | 210/42 |
| 3,661,515 | 5/1972 | Iannicelli et al. | 23/110 R |
| 3,798,044 | 3/1974 | Whitley et al. | 106/286 B |
| 4,125,411 | 11/1978 | Lyons | 106/291 |
| 4,210,574 | 7/1980 | Stephens | 260/42.16 |
| 4,227,920 | 10/1980 | Chapman et al. | 75/1 R |
| 4,281,799 | 8/1981 | Oder | 241/24 |
| 4,615,869 | 10/1986 | Kremer et al. | 423/167 |
| 4,623,398 | 11/1986 | Goodman et al. | 106/308 |
| 4,631,091 | 12/1986 | Goodman | 106/308 |
| 4,743,305 | 5/1988 | Doidge et al. | 106/308 N |
| 4,792,539 | 12/1988 | Yamanaka et al. | 501/144 |
| 4,987,106 | 1/1991 | Mizutani et al. | 501/147 |
| 5,128,027 | 7/1992 | Halaka et al. | 209/5 |
| 5,129,953 | 7/1992 | Suitch et al. | 106/416 |
| 5,143,599 | 9/1992 | Derdall et al. | 209/166 |
| 5,190,900 | 3/1993 | Toro et al. | 501/148 |
| 5,223,463 | 6/1993 | Bilimoria et al. | 501/146 |
| 5,227,349 | 7/1993 | Matthews et al. | 501/145 |
| 5,242,874 | 9/1993 | De Oliveira et al. | 501/146 |
| 5,376,605 | 12/1994 | Iannicelli | 501/147 |

FOREIGN PATENT DOCUMENTS

| 930869 | 7/1955 | Germany . |
|---|---|---|
| 50-33489 | 10/1975 | Japan . |

OTHER PUBLICATIONS

Murray, *Major Kaolin Processing Developments*, International Journal of Mineral Processing, pp. 263–274 (1980). (no month).

Murray, *Diagnostic Tests for Evaluation of Kaolin Physical Properties*, Acta Mineralogica–Petrographica, XXIV, pp. 67–76 (1980). (no month).

Pickering et al., *Kaolin*, pp. 255–270. (Date Unknown).

*Primary Examiner*—Karl Group
*Assistant Examiner*—Michael Marcheschi
*Attorney, Agent, or Firm*—Bell, Seltzer, Park & Gibson, P.A.

[57] ABSTRACT

The present invention provides a process for whitening kaolin contaminated with chlorite/biotite micas. The process comprises the steps of contacting the kaolin contaminated with chlorite/biotite micas with an aqueous acid solution to convert the chlorite/biotite micas into kaolin and one or more dissolved metal salts, and separating the kaolin from the dissolved metal salts. The present invention also provided an overall system for whitening kaolin contaminated with chlorite/biotite micas. The process comprises blunging the kaolin contaminated with chlorite/biotite micas to provide a 20 to 70 percent solid slurry, degritting the slurry, delaminating the degritted slurry, fractionating the degritted slurry, subjecting the slurry to a magnetic field to remove iron or iron-titanium oxides, reductive leaching the slurry, contacting the slurry with an aqueous acid solution to convert the chlorite/biotite micas into kaolin or a kaolin-like clay and one or more dissolved metal salts (e.g., iron, magnesium, and potassium salts), and separating the kaolin or kaolin-like clay from the dissolved metal salts.

15 Claims, 5 Drawing Sheets

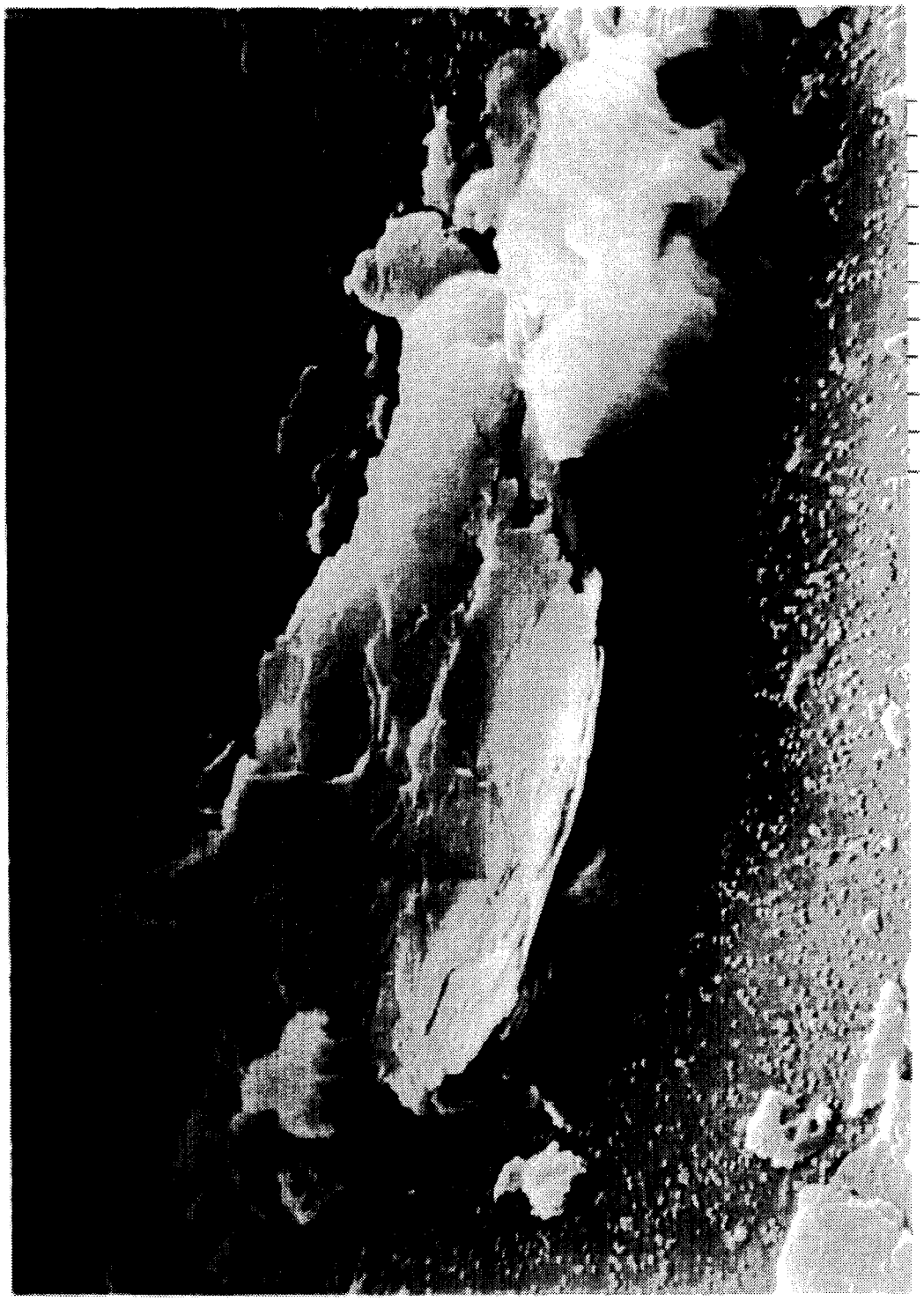

PROCESS FOR WHITENING KAOLIN

FIELD OF THE INVENTION

The present invention relates to kaolin, and more particularly to a process for whitening kaolin contaminated with chlorite/biotite mica.

BACKGROUND OF THE INVENTION

The term "kaolin" as it is used herein relates to near-white clay deposits which are dominantly comprised of the mineral kaolinite having the formula $Al_4Si_4O_{10}(OH)_8$, possibly with lesser amounts of the kaolin-group mineral, halloysite. Geologically, kaolins appear in the form of deposits of relatively fine particle size, resulting from the weathering of feldspathic rocks. Kaolin deposits can be classified as primary and secondary. Primary kaolins originate from the weathering of rocks such as granite or granite gneiss which contain high concentrations of feldspathic minerals and are found in the location where they were formed. Secondary kaolins originate from being borne along by river or lake freshwater currents, with subsequent settling and deposition in association with with other minerals such as quartz and mica.

Kaolin is used widely as a pigment, filler, coater, extender, ceramic raw material, catalyst base, electrical insulator, and pharmaceutical. Some more prominent uses include paper filling and coating; paint, plastic, adhesive, and ink pigment; rubber reinforcing agent; ceramic raw material from porcelain, dinnerware, tile, and enamels; catalyst base for petroleum cracking and auto exhaust emission catalytic control devices; cosmetics base; and digestive coating remedy.

Crude kaolin, however, typically contains various impurities which cause discoloration, most which are removed in order to make a commercially useful product, particularly as a paper coating. The coarser impurities, generally quartz, muscovite, and heavy minerals, are separated by settling or screening. However, there are usually micron-size impurities such as anatase, limonite, hematite, pyrite, organic matter, illite (hydromuscovite), montmorillonite (smectite), muscovite, and chlorite/biotite micas, etc. The partial or complete removal of these impurities in a economical manner has been the subject of much research and process equipment development in the industry, particularly with respect to improving whiteness and brightness of kaolin clay.

For many years, the only available method to maintain brightness and whiteness was that of selection. Only those clays which are naturally white and bright were mined, and the vast bulk of clay were simply by-passed or discarded. A technique suitable to produce a product for use in the paper industry has been to deflocculate the parent ore in an aqueous suspension and to separate the fine and coarse particles by a sedimentation process; either gravity or centrifugal. After separation the fine and coarse fractions were treated by various processes to enhance their usefulness to the paper industry. Another technique is chemical leaching using a clay reducing agent such as zinc or sodium hydrosulfite.

Only a very small percentage of the available clay, however, could be processed in any of these manners. Recognizing this, the industry has sought means for recovering, beneficiating, and using a greater percentage of natural kaolin clay. As a result, there have been, in recent years, many techniques developed for beneficiating and improving the whiteness and brightness of kaolin clay products. These techniques involve treatment of both the parent ore or a fraction of the parent ore and have been primarily developed for the beneficiation of kaolin clay products useful to the paper industry. For example, U.S. Pat. No. 3,471,011 to Iannicelli et al. proposes magnetic beneficiation utilizing techniques wherein a slurry of kaolin is subjected to a high intensity magnetic field of at least 8500 gauss. U.S. Pat. No. 3,414,422 to Iannicelli et al. proposes treating a kaolin slurry with a concentrated mineral acid, followed by subjecting the kaolin/acid mixture to high shear at an elevated temperature and washing the acid from the kaolin.

U.S. Pat. No. 5,128,027 to Halaka et al. proposes a process for removing mineral slimes from a slurry of kaolin comprising treating the kaolin slurry with a dispersing agent (e.g., polyphosphate) in the amount in excess of the amount required to obtain a minimum slurry viscosity, followed by recovering the kaolin fraction of the slurry by sedimentation from the supernatant slurry containing the fine particle fraction. U.S. Pat. No. 5,190,900 to Toro et al. relates to a chemical process for removing ferric iron present in small quantities in concentrates of various materials including kaolin. The process suspends the kaolin or other material in a bath comprising a 0.1 to 5M solution of an acid (e.g., hydrochloric acid) and a sugar such as fructose. The process of the reference enables the iron present as ferric iron ($Fe^{3+}$) in the material to be removed by washing. U.S. Pat. No. 5,242,874 to De Oliveira et al. proposes a process for whitening kaolin in which aluminum powder, which is previously dissolved in hydrochloric acid, is added to remove a film of $Al_2O_3$ which helps in the removal of iron.

These techniques, however, have limitations particularly in that the impurities are always removed and there is a weight loss of kaolin during processing. Moreover, these techniques do not work for the specific impurity, chlorite/biotite micas, that are sometimes found in kaolin deposits, and are of particular interest herein. Chlorites and biotites are widely distributed through Minnesota kaolin and tint the kaolin greenish-gray. Thus, there remains a need for a technique to brighten and whiten this type of kaolin.

SUMMARY OF THE INVENTION

To this end, the present invention provides a process for whitening kaolin contaminated with chlorite/biotite micas, i.e., kaolin primarily found in Minnesota and sometimes referred to as "Minnesota chloritic kaolin." The process comprises the steps of contacting the kaolin contaminated with chlorite/biotite micas with an aqueous acid solution, preferably at a pH of less than about 2, to convert the chlorite/biotite micas into kaolin or a kaolin-like clay (i.e., a "kaolinitic particle") and one or more dissolved metal salts, and separating the kaolin or kaolin-like clay from the dissolved metal salts. It is believe that the metal salts so removed are primarily salts of magnesium, potassium, and iron.

The present invention also provided an overall system for whitening kaolin contaminated with chlorite/biotite micas. The process comprises blunging the kaolin contaminated with chlorite/biotite micas to provide a 20 to 70 percent solid slurry, degritting the slurry, delaminating the degritted slurry, fractionating the degritted slurry, subjecting the slurry to a magnetic field to remove iron or iron-titanium oxides, reductive leaching the slurry, contacting the slurry with an aqueous acid solution to convert the chlorite/biotite micas into kaolin or a kaolin-like clay and one or more dissolved metal salts (e.g., iron, magnesium, potassium, and iron salts), and separating the kaolin or kaolin-like clay from the dissolved metal salts.

BRIEF DESCRIPTION OF THE DRAWING

FIG. 2A is an electron micrograph of untreated kaolin contaminated with chlorite/biotite mica.

FIG. 3A is an electronmicrograph of kaolin after treatement according to the invention.

DETAILED DESCRIPTION OF THE INVENTION

As summarized above, the present invention relates to whitening kaolin contaminated with chlorite/biotite micas. Such kaolin is often found in Minnesota and is dark green or greenish-gray in color, primarily due to the presence of about 10 to 20 percent fine chlorite/biotite micas. Such chlorite/biotite micas have high concentrations of magnesium, potassium, and iron salts. Because of the discoloration, the raw kaolin has limited commercial use, particularly for use in the paper industry. Specifically for use as a paper coating, the kaolin must have a GE (Tappi) brightness of at least 85 as compared to crude kaolin having a GE brightness of 50 to 75. None of the conventional process (e.g., hydrosulfite leach, magnetic separation, delamination, etc.) are particularly successful in improving the whiteness and brightness of kaolin contaminated with chlorite/biotite micas. Moreover, most conventional processes remove or subtract the impurities.

The present invention is a significant departure from conventional thinking and techniques for improved whiteness and brightness. The process of the present invention, rather than removing the impurities, converts the chlorite/biotite micas into kaolin or a kaolin-like clay which is of similar whiteness and brightness to the predominant kaolin in the deposit. Although Applicants do not wish to be bound by any one theory, it is believed that inasmuch as the chlorite/biotite micas are hydrous metal alumino-silicates, the micas can be converted to kaolin or kaolin-like clay (a hydrous alumino-silicate) by contacting with an aqueous acid solution. The converted kaolin is then separated from the residual metal salts, i.e., the salts of magnesium, potassium, and iron.

Figure 1:
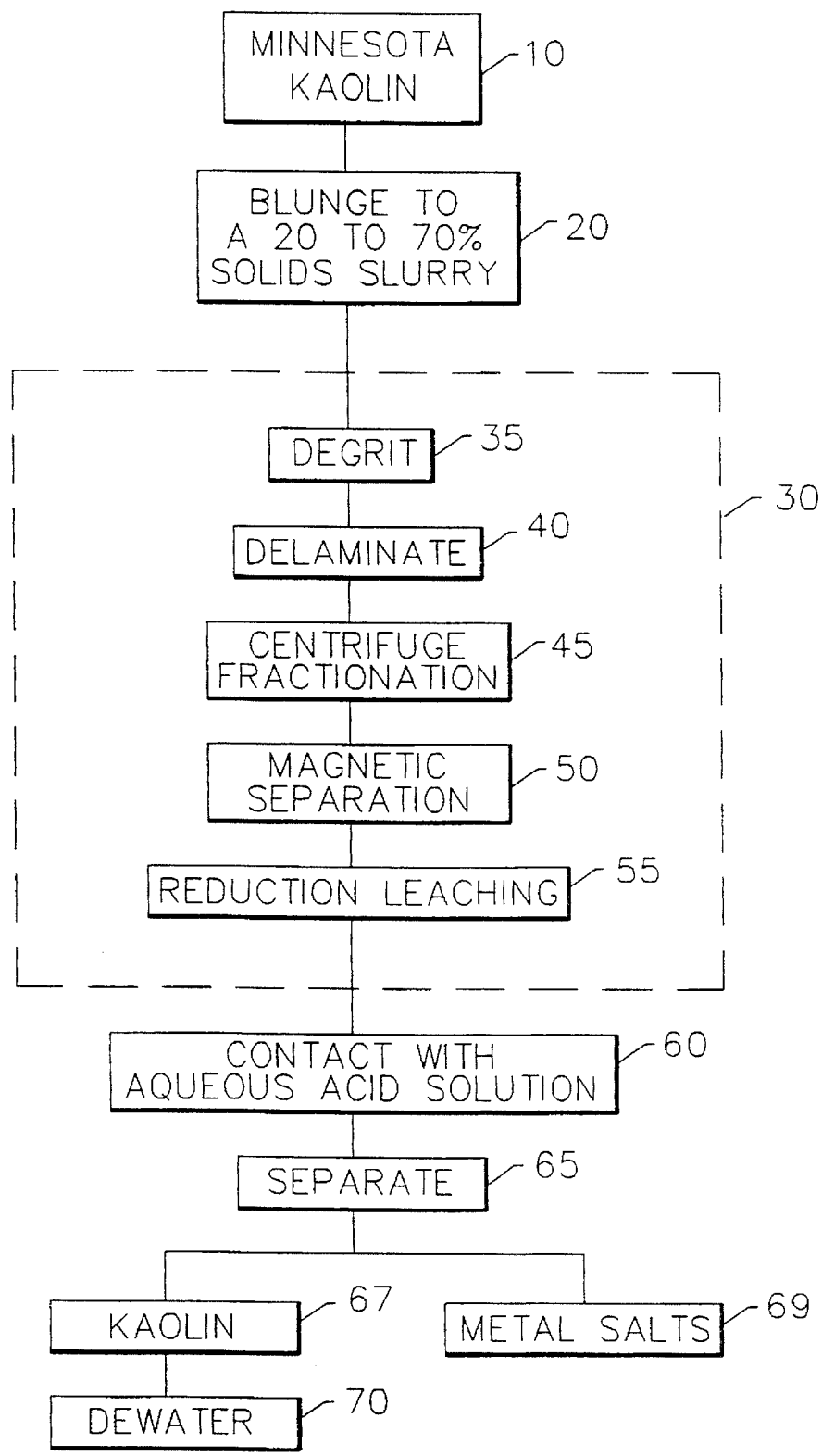
FIG. 1 is a block diagram illustrating a process for whitening kaolin in accordance with the present invention.

In operation to further improve whiteness and brightness, the process of the present invention can be combined with conventional techniques for removing other impurities, i.e., those impurities such as mineral contaminants which are not part of the kaolin. To this end, an overall process scheme is shown in FIG. 1. Minnesota chloritic kaolin 10 is blunged 20 to a 20 to 70 percent, and preferably 30 to 40 percent solids slurry. The crude kaolin is typically dispersed or defloculated in water with the aid of a dispersing agent to form a flowable slurry. Suitable dispersing agents are well known in the kaolin beneficiation art and include polyphosphates, carbonates, silicates, inorganic alkalis, and their salts, and mixtures thereof. The dispersing agents may be used in combination with ionic salts such as sodium chloride, sodium sulfate, etc. A specific dispersant is a mixture of ⅔ sodium hexametaphosphate (Calgon®) and ⅓ soda ash ($Na_2CO_3$).

The slurry then undergoes one or more conventional techniques 30 for removing impurities, i.e., the slurry is degritted 35, delaminated 40, submitted to centrifuge fractionation 45, magnetic separation 50, and reduction leaching 55. It is recognized that the selection of the order of practicing such techniques and which techniques are used are within the skill of one in the art. Such conventional techniques typically individually or collectively improve the brightness of only about 0.5 up to 12 points above that of crude kaolin.

To degrit 35 the slurry, it is passed through a screen, e.g., a U.S. standard $^+100$ mesh screen to remove coarse or abrasive material (e.g., quartz) that are no part of the kaolin. Preferably after degritting, the slurry is delaminated 40 and submitted to centrifugation 45 to fractionate the slurry using conventional techniques to provide a slurry having a particle size distribution of at least 60 percent by weight of particles less than 2 microns in equivalent spherical diameter.

Preferably after fractionation, the slurry is passed through a magnetic separator to remove at least a portion of any iron-based impurities (e.g., iron or iron-titanium oxides). An exemplary wet magnetic separator manufactured by Pacific Electric Motor Company of Oakland, Calif. The magnet produces a maximum field intensity of up to 20 kilogauss. The slurry is then leached with a conventional leaching agent such as zinc hydrosulfite or sodium hydrosulfite. The techniques up to this point are conventional and are primarily subtractive in nature.

The kaolin treated as outlined above is then contacted 60 with an aqueous acid solution, preferably heated to a temperature above room temperature (i.e., 26° C.). Suitable acids include hydrochloric acid, sulfuric acid, and mixtures thereof. The selection of other acids such as acetic acid will be within the skill of one art recognizing that it is preferred that the acid having a high $H^-$ ion concentration (i.e., a pH less than about 2 at room temperature). It is recognized that the step of contacting 60 with the aqueous acid solution can be done at any time before or after any of the various conventional techniques 30. Also, it is recognized that pH's of from 2 to 3 may be used if the kaolin or acid or both are heated to a temperature greater than room temperature.

The kaolin or kaolin-like clay 67 is then separated 65 from the metal salt 69 formed by the conversion of the chlorite/biotite micas. The kaolin or kaolin-like clay 67 can be separated or dewatered 70 by any conventional technique such as centrifugation, filtration, or static sedimentation. After such treatment, the kaolin may be calcined by heating in a kiln to a temperature of about 700° C. to 1100° C.

EXAMPLE 1

This Example illustrates the successful improvement in brightness and whiteness of a sample of kaolin contaminated with a greenish-gray chlorite/biotite mica.

A kaolin crude sample from south-central Minnesota is obtained. The kaolin is characterized by a dark green color. The crude kaolin is dispersed in water having a 0.1 percent mixture of ⅔ sodium hexametaphosphate and ⅓ soda ash as a dispersant to form a slurry. The slurry is screened to remove $^+100$ mesh grit. This coarse grit is about 25 to 60 percent of the sample.

The slurry is then delaminated on attrition with glass beads and fractionated using a centrifuge to provide a slurry having a particle size distribution of 80 percent by weight of particles less than 2 microns in equivalent spherical diameter. The slurry then undergoes magnetic separation by two passes through a Pacific Electric Motor magnetic separator operated at 2 Tesla (20,000 kilogauss) field strength. The slurry is then subjected to a sodium hydrosulfite reducing leach with 6 lbs/ton hydrosulfite at a beginning pH of 3.0.

The slurry is then contacted with a 16 percent solution of HCl at a pH of 1.3. A further oxidation chemical leach with 0.1 percent of sodium hydrosulfite is done. The slurry is dewatered by vacuum filtration. Table 1 summarizes the GE brightness measurements at each step. The brightness is measured in accordance with TAPPI procedure 649 05–75 on a brightness-determining instrument manufactured by the Technidyne Corporation of New Albany, Ind.. The color is determined using the L*, a*, b* scale. The L*, a*, b* scale is based on the opponent-colors theory of color vision which presumes that in the human eye there is an intermediate signal-switching stage between the light receptors in the retina and the optic nerve taking color signals to the brain. In this switching stage, red responses are compared with green to generate a red-to-green color dimension. The green (or red and green together, depending on theory used) response is compared in a similar manner with the blue to generate a yellow-to-blue color dimension. These two dimensions are often, though not always, associated with the symbols "a*" and "b*," respectively. The necessary third dimension, "L*," for grayness, is usually a nonlinear function such as the square root or cube root of one of the dimensions.

TABLE 1

| PROCESS | GE BRIGHTNESS | HUNTER COLOR | | |
|---|---|---|---|---|
| | | L (gray) | a (green) | b (yel.) |
| Degrit | 58.7 | 81.0 | −2.0 | +7.0 |
| Delaminate | 62.4 | 82.9 | −1.9 | +6.5 |
| Fractionate | 61.0 | 82.3 | −1.9 | +6.9 |
| Remove magnetic minerals | 61.4 | 82.2 | −1.5 | +7.3 |
| Reductive leach | 64.5 | 83.5 | −1.8 | +5.7 |
| Acid leach to pH 1.3 with hydrochloric acid | 89.7 | 95.3 | −0.3 | +1.9 |
| Oxidation chemical leach with 0.1% of sodium hypochlorite: | 90.4 | 95.7 | −0.4 | +2.1 |

As is readily apparent, there is a significant improvement in brightness of the Minnesota chloritic kaolin using the process of the invention.

EXAMPLE 2

Figure 2B:
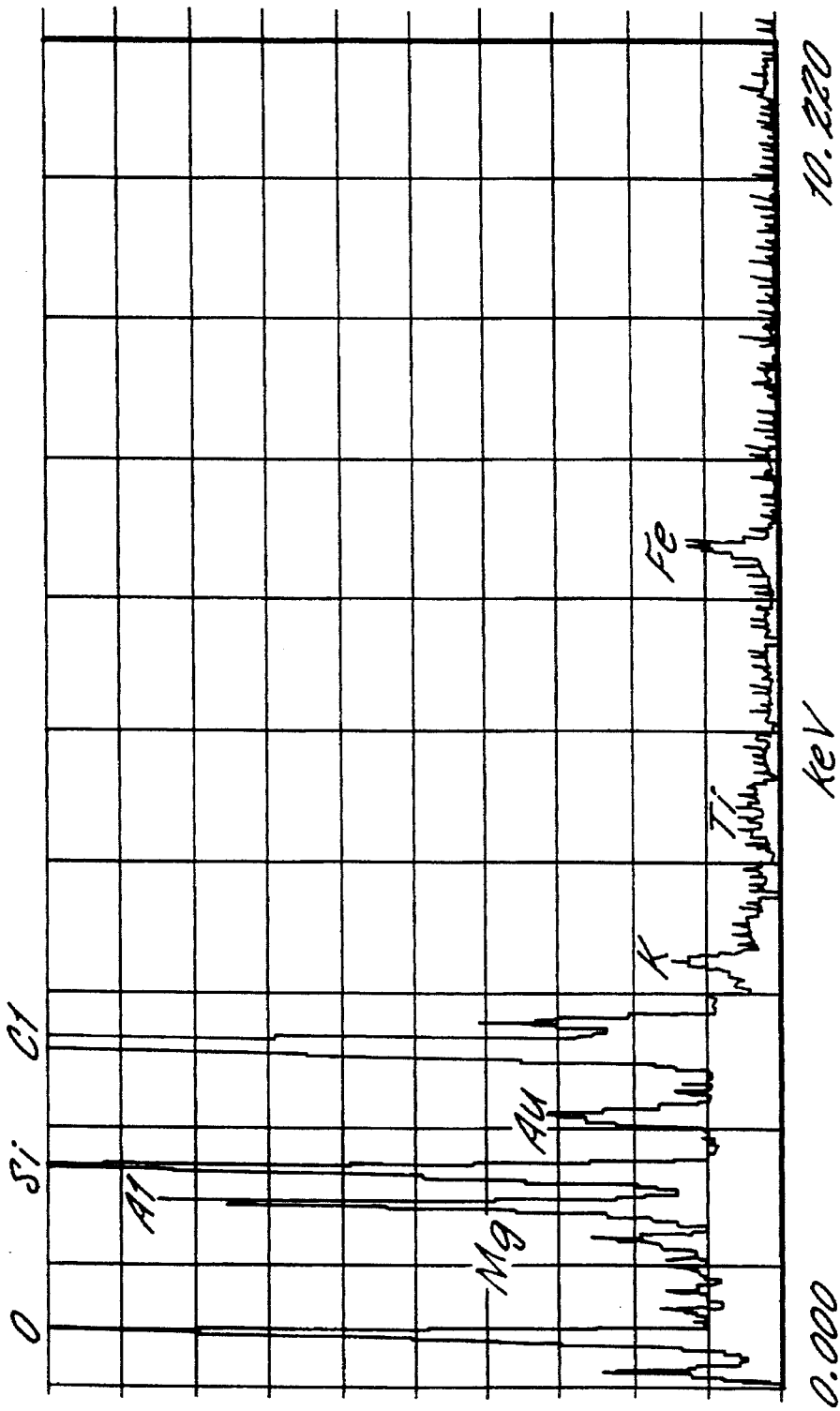
FIG. 2B is an Energy Dispersive X-Ray Analysis (EDRAX) of the elemental composition of untreated kaolin contamined with chlorite/biotite mica.

In order to demonstrate the physical and compositional differences between untreated kaolin and kaolin treated according to the invention, an untreated sample is analyzed using a electron microscope, the resulting micrograph for which is shown in FIG. 2A. An EDRAX analysis is shown in FIG. 2B. The EDRAX analysis shows substantial amounts of magnesium, potassium, and iron present.

Figure 3B:
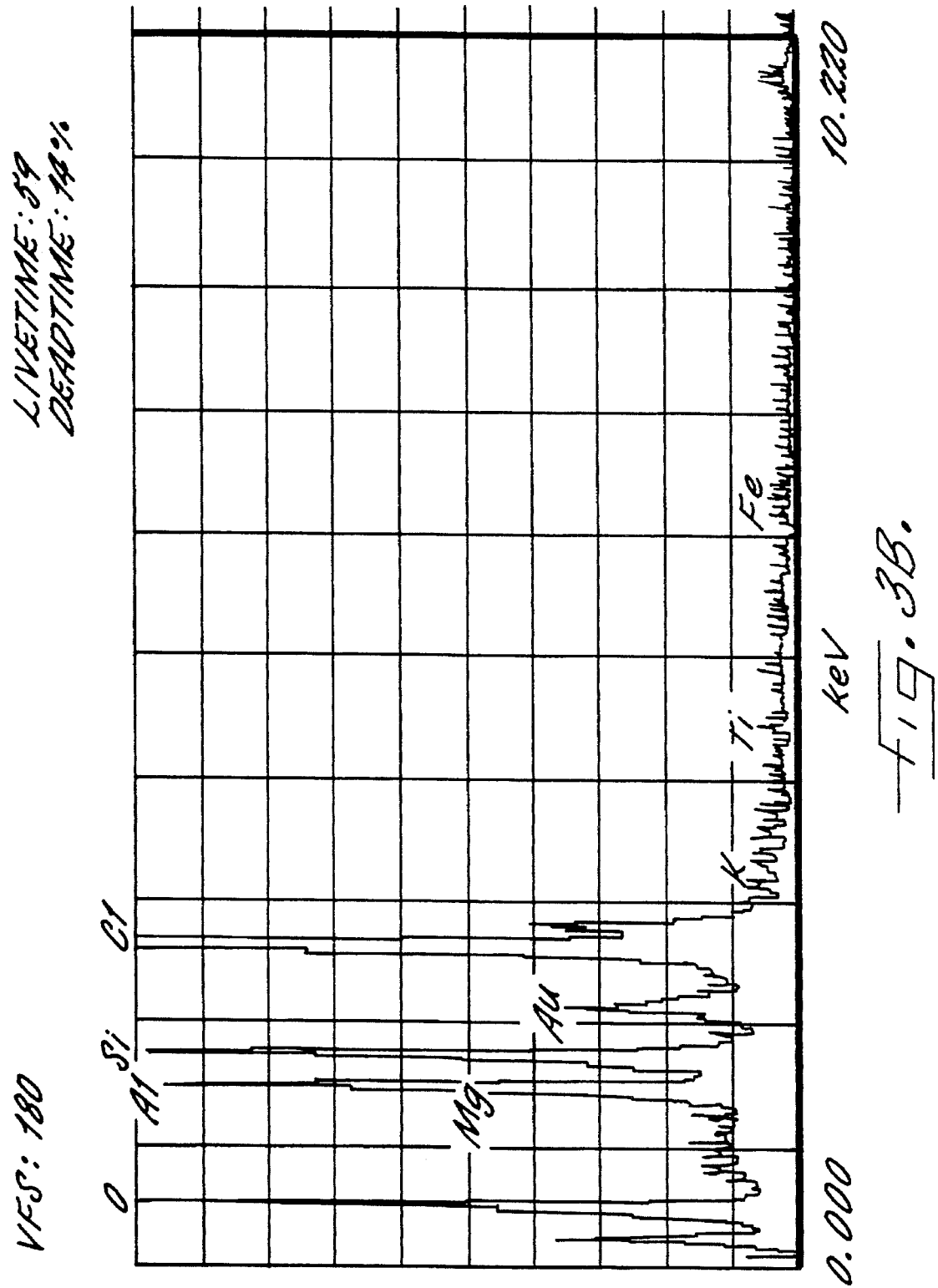
FIG. 3B is an Energy Dispersive X-Ray Analysis (EDRAX) of the elemental composition of kaolin after treatment according to the invention.

The sample is then contacted with HCl at a pH of 1.3, and its micrograph and EDRAX analysis are shown in FIGS. 3A and 3B, respectively. The EDRAX analysis shows that very little amounts of magnesium potassium and iron are present after contacting with HCl. Comparison of the micrographs indicated no difference in habit, cleavage, or surface texture between untreated and treated kaolin.

The foregoing examples are illustrative of the present invention, and are not to be construed as limiting thereof. The invention is defined by the following claims, with equivalents of the claims to be included therein.

That which is claimed is:

1. A process for whitening kaolin contaminated with chlorite/biotite micas, the process comprising the steps of contacting the kaolin contaminated with chlorite/biotite micas with an aqueous acid solution at a pH of less than about 2 to convert the chlorite/biotite micas into kaolin and one or more dissolved metal salts, and separating the kaolin from the dissolved metal salts.

2. The process according to claim 1, wherein the acid of the aqueous acidic solution is selected from the group consisting of hydrochloric acid, sulfuric acid, and mixtures thereof.

3. The process according to claim 1, including the step of removing mineral contaminants from the kaolin.

4. The process according to claim 3, wherein the mineral contaminants are iron oxide minerals and the step of removing any mineral contaminants comprises contacting the kaolin with a hydrosulfite at a pH of 3 to 4.5.

5. The process according to claim 3, wherein mineral contaminants are iron or iron-titanium oxides or both, and the step of removing the mineral contaminants comprises subjecting the kaolin to a magnetic field.

6. The process according to claim 1, including the step of degritting the kaolin to remove coarse material prior to contacting the kaolin with the aqueous acid solution.

7. The process according to claim 1, wherein the step of contacting the kaolin with the aqueous acid solution includes heating the kaolin to a temperature above room temperature.

8. In a process for whitening kaolin by removing impurities therein including one or more techniques for removing impurities comprising degritting, delaminating, centrifuge fractionation, magnetic separation or reduction leaching, the improvement comprising after removing the impurities, the step of contacting the kaolin with an aqueous acid solution to convert chlorite/biotite micas into kaolin.

9. In a process according to claim 8, wherein the acid of the aqueous acidic solution is selected from the group consisting of hydrochloric acid, sulfuric acid, and mixtures thereof.

10. In a process according to claim 8, wherein the step of contacting the kaolin with the aqueous acid solution includes heating the kaolin to a temperature above room temperature.

11. In a process according to claim 8, wherein the step of contacting the kaolin with the aqueous acid solution is conducted at a pH of 2.

12. A process for whitening kaolin contaminated with chlorite/biotite micas, the process comprising the steps of:

(a) blunging the kaolin contaminated with chlorite/biotite micas to a 20 to 70 percent solids slurry;

(b) degritting the slurry;

(c) delaminating the degritted slurry;

(d) fractionating the degritted slurry;

(e) subjecting the slurry to a magnetic field to remove iron or iron-titanium oxides;

(f) reductive leaching the slurry with a hydrosulfite at pH of 3 to 4.5;

(g) contacting the slurry with an aqueous acid solution to convert the chlorite/biotite micas into kaolin and one or more metal salts; and (h) separating the kaolin from the metal salts.

13. The process according to claim 12, wherein the acid of the aqueous acidic solution is selected from the group consisting of hydrochloric acid, sulfuric acid, and mixtures thereof.

14. The process according to claim 12, wherein the step of contacting the kaolin with the aqueous acid solution includes heating the kaolin to a temperature above room temperature.

15. The process according to claim 12, wherein the step of contacting the kaolin with the aqueous acid solution is conducted at a pH of less than about 2.

\* \* \* \* \*